United States Patent
Kwon et al.

(10) Patent No.: US 9,900,134 B2
(45) Date of Patent: Feb. 20, 2018

(54) REFERENCE SIGNAL PRESENCE DETECTION BASED LICENSE ASSISTED ACCESS AND REFERENCE SIGNAL SEQUENCE DESIGN

(71) Applicant: Intel IP Corporation, Santa Clara, CA (US)

(72) Inventors: Hwan-Joon Kwon, Santa Clara, CA (US); Youn Hyoung Heo, San Jose, CA (US); Seunghee Han, Cupertino, CA (US); Pingping Zong, Randolph, NJ (US); Xiangyang Zhuang, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 307 days.

(21) Appl. No.: 14/747,663

(22) Filed: Jun. 23, 2015

(65) Prior Publication Data

US 2016/0173249 A1    Jun. 16, 2016

Related U.S. Application Data (60) Provisional application No. 62/091,950, filed on Dec. 15, 2014.

(51) Int. Cl.
| | |
|---|---|
| *H04L 5/00* | (2006.01) |
| *H04W 16/14* | (2009.01) |
| *H04L 27/00* | (2006.01) |

(52) U.S. Cl.
CPC ........ *H04L 5/0048* (2013.01); *H04L 27/0006* (2013.01); *H04W 16/14* (2013.01)

(58) Field of Classification Search
CPC ... H04L 5/0048; H04L 27/0006; H04W 16/14
See application file for complete search history.

(56) References Cited

U.S. PATENT DOCUMENTS

| | | |
|---|---|---|
| 2007/0202867 A1 | 8/2007 | Waltho et al. |
| 2013/0163543 A1 | 6/2013 | Freda et al. |

(Continued)

FOREIGN PATENT DOCUMENTS

| | | |
|---|---|---|
| WO | WO-2012078565 A1 | 6/2012 |
| WO | WO-2016099801 A1 | 6/2016 |

OTHER PUBLICATIONS

"International Application Serial No. PCT/US2015/061829, International Search Report dated Feb. 25, 2016", 3 pgs.

(Continued)

*Primary Examiner* — Chi H Pham
*Assistant Examiner* — Weibin Huang
(74) *Attorney, Agent, or Firm* — Schwegman Lundberg & Woessner, P.A.

(57) ABSTRACT

A user equipment device comprises physical layer circuitry configured to transmit and receive radio frequency electrical signals with one or more nodes of a radio access network, including monitor at least one of a communication channel unlicensed to a long term evolution (LTE) network (LTE-U) or a communication channel of a licensed assisted access (LAA) network and detect a reference signal (RS) of a subframe communicated using the at least one communication channel; and processing circuitry configured to measure a channel metric over at least a portion of the subframe that includes the RS, and process information included in the subframe according to an LTE communication protocol when the measured channel metric satisfies a specified channel metric threshold value.

20 Claims, 4 Drawing Sheets

(56) References Cited

U.S. PATENT DOCUMENTS

| | | | |
|---|---|---|---|
| 2013/0336156 A1 | 12/2013 | Wei et al. | |
| 2014/0064227 A1 | 3/2014 | Zhang et al. | |
| 2015/0009869 A1* | 1/2015 | Clegg | H04L 5/0062 370/278 |
| 2016/0044548 A1* | 2/2016 | Choi | H04W 36/04 370/331 |
| 2016/0119021 A1* | 4/2016 | Sorrentino | H04L 27/2613 375/138 |
| 2016/0127057 A1* | 5/2016 | Yang | H04B 17/345 370/252 |
| 2016/0135179 A1* | 5/2016 | Yin | H04J 11/0069 370/329 |

OTHER PUBLICATIONS

"International Application Serial No. PCT/US2015/061829, Written Opinion dated Feb. 25, 2016", 8 pgs.

* cited by examiner

REFERENCE SIGNAL PRESENCE DETECTION BASED LICENSE ASSISTED ACCESS AND REFERENCE SIGNAL SEQUENCE DESIGN

PRIORITY APPLICATION

This application claims the benefit of priority to U.S. Provisional Application Ser. No. 62/091,950, filed Dec. 15, 2014, which is incorporated herein by reference in its entirety.

TECHNICAL FIELD

Embodiments pertain to transmitting voice data using radio access networks. Some embodiments relate to mobile telephone communication networks.

BACKGROUND

Radio access networks are used for delivering one or more of data communications, voice communications, and video communications to user equipment such as a cellular telephone or a smart phone. Some radio networks are packet switched networks and packetize information such as voice and video data when it is sent over the network. As the demand for communicating voice and video over radio access networks increases, quality of service can deteriorate as the radio access networks approach their peak capacity. Thus, there are general needs for devices, systems and methods that provide a robust protocol for communication with user equipment.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
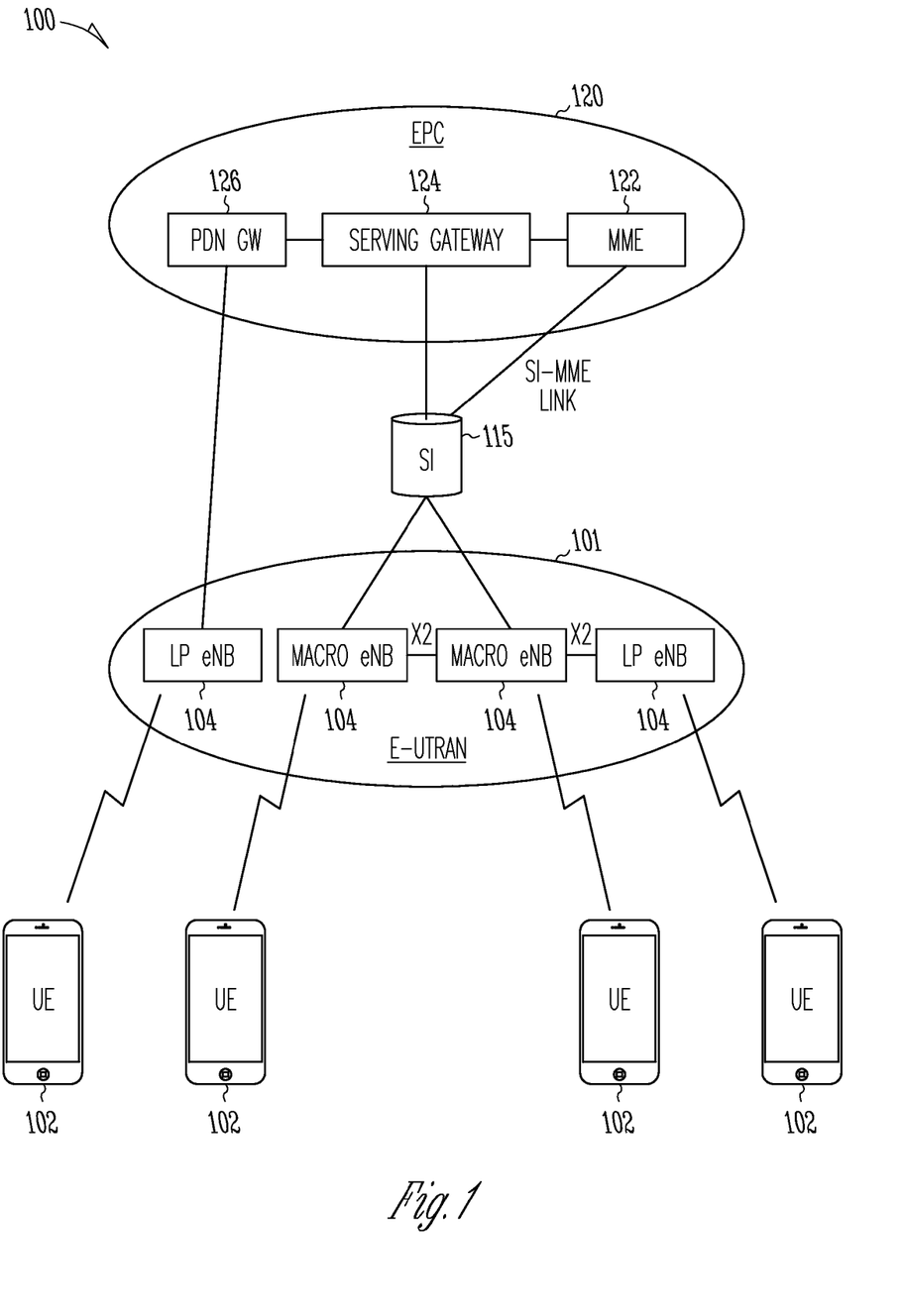
FIG. 1 shows an example of a portion of an end-to-end network architecture of an LTE network with various components of the network in accordance with some embodiments.

FIG. 1 shows an example of a portion of an end-to-end network architecture of an LTE network with various components of the network in accordance with some embodiments. The network 100 comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity, only a portion of the core network 120, as well as the RAN 101, is shown in the example.

The core network 120 includes mobility management entity (MME) 122, serving gateway (serving GW) 124, and packet data network gateway (PDN GW) 126. The RAN includes enhanced node B's (eNBs) 104 (which may operate as base stations) for communicating with user equipment (UE) 102. The eNBs 104 may include macro eNBs and low power (LP) eNBs.

The MME is similar in function to the control plane of legacy Serving GPRS Support Nodes (SGSN). The MME manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

The S1 interface 115 is the interface that separates the RAN 101 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

A cellular telephone network can include fixed location transceivers distributed land areas. Cell transceivers of the network may be included in cell towers to serve large land areas and cell transceivers may be arranged to serve smaller areas or to provide localized service such as within a building. The transceivers and the areas that they serve can be referred to as cells of the cellular network. With cellular networks, low power (LP) cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a microcell.

Femtocell eNBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB to a UE. The grid may be a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain; this represents the smallest quanta of resources that currently can be allocated. There are several different physical downlink channels that are conveyed using such resource blocks. Two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE about the transport format, resource allocation, and hybrid automatic repeat request (H-ARQ) information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level, L, =1, 2, 4, or 8).

As explained previously, the demand for communicating one or both of voice data and video data continues to increase. A RAN 101 may experience heavy communication traffic which can lead to adverse network effects such as communication latency for example. As shown in FIG. 1, a RAN can include UE devices and eNB devices such as LP eNBs and/or macro eNBs. To alleviate network traffic, network capacity can be added by providing communication capability to the RAN devices from networks that operate using a communication spectrum not licensed for use by the cellular network devices. Use of a network unlicensed to LTE network devices is sometimes referred to as unlicensed LTE (LTE-U) or a licensed assisted access (LAA) network.

To extend an LTE platform into LTE-U, frequency bands of the LTE-U can be considered as available carriers and the UEs share the LTE-U frequency spectrum with other radio access technologies (RAT). For example, communication peaks may occur locally and the RAN serving the locality may experience peak demand. The locality may include a Wi-Fi network for computing devices such as laptop computers and computer tablets, but the wireless cellular devices are not licensed to operate in the Wi-Fi communication spectrum (e.g., communication channels of 2.4 gigahertz (GHz) or 5 GHz).

The wireless cellular devices of a RAN (e.g., an LTE network) may schedule communication time on an LTE-U network channel. A complication may result if the LTE-U frequency spectrum is shared by communicating devices such as Wi-Fi devices or other types of radio access technology devices. To promote fairness in access to the LTE-U, the LTE-U may implement a listen before talk (LBT) protocol. In LBT, a device senses a shared communication channel and waits until the channel is idle before attempting to use the channel.

Figure 2:
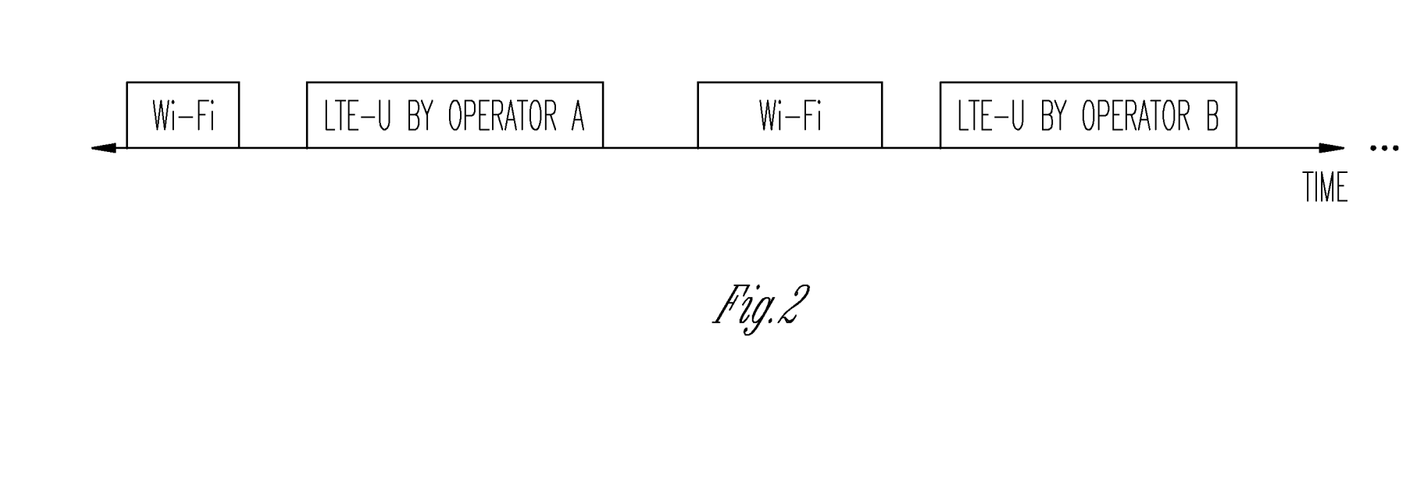
FIG. 2 illustrates an example of multiple types of communication devices sharing an unlicensed LTE communication channel or a licensed assisted access communication channel in accordance with some embodiments.
Figure 3:
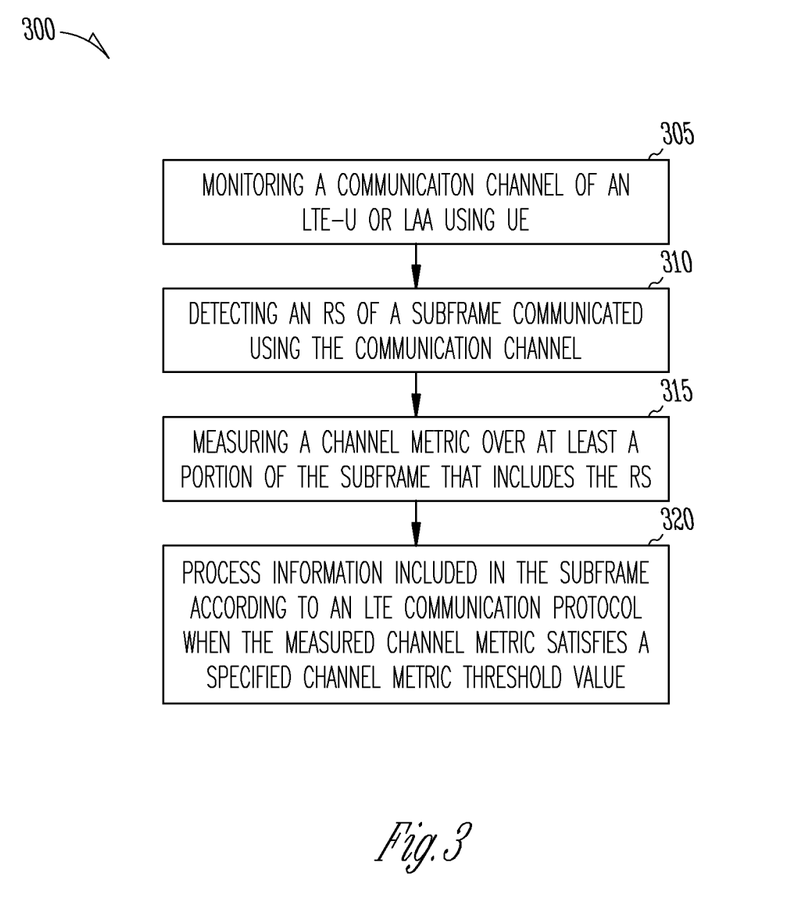
FIG. 3 shows a flow diagram of an example of a method of operating user equipment of an end-to-end communication network in accordance with some embodiments.

FIG. 2 illustrates an example of how multiple types of communication devices may share a communication channel of the LTE-U. To operate in the LTE-U network, an eNB may transmit signals only when the eNB senses that a shared channel or channels of the LTE-U frequency spectrum are idle. In the example of FIG. 3, the LTE-U is a Wi-Fi network and the eNBs share time on a communication channel with the Wi-Fi devices. FIG. 2 shows access to the LTE-U by Operator A and Operator B. This shows that the same channel or channels of an LTE-U may be accessed by different LTE networks.

The example of FIG. 2 shows that communication by a UE over an LTE-U network is intermittent unlike the licensed LTE network. Because the communication is intermittent, a mechanism is needed by which a UE can recognize a subframe being transmitted by an eNB from communications from other types of devices communicating over the LTE-U.

Cell specific reference signals (i.e., pilot symbols) can be inserted in communications in both time and frequency to facilitate the estimation of the channel characteristics LTE uses. These reference signals provide an estimate of the channel at given locations within a subframe. Through interpolation it is possible to estimate the channel across an arbitrary number of subframes. The reference signals in LTE are assigned positions within a subframe depending on the eNB cell identification number and which transmit antenna is being used. The unique positioning of the reference signals ensures that they do not interfere with one another and can be used to provide a reliable estimate of the complex gains imparted onto each resource element within the transmitted grid by the propagation channel.

Least square estimates of reference signals can be averaged using an averaging window to minimize the effects of noise on the estimates. This averaging can produce a substantial reduction in the level of noise found on the reference signals. Time averaging is performed across each reference signals carrying subcarrier, resulting in a column vector containing an average amplitude and phase for each reference signal carrying subcarrier. All the reference signals found in a subcarrier are time averaged across all OFDM symbols, resulting in a column vector containing the average for each reference signal subcarrier. The averages of the reference signals subcarriers may then be frequency averaged using a moving window of maximum size. These reference signals can be used to recognize a communication from an eNB on a shared communication channel.

FIG. 3 shows a flow diagram of an example of a method 300 of operating a UE device of an end-to-end communication network. At 305, a communication channel is monitored using the UE. The communication channel is at least one of a communication channel unlicensed to a long term evolution (LTE) network (LTE-U) or a communication channel of a licensed assisted access (LAA) network.

At 310, a reference signal (RS) of a subframe that is communicated using the communication channel is detected by the UE. Some examples of the RS include a cell specific reference signal (CRS), a channel state information reference signal (CSI), and a demodulation reference signal (DM-RS). At 315, the UE measures a channel metric over at least a portion of the detected subframe that includes the RS. An example of a channel metric is the power level of the signal transmitting the RS of the subframe or the total energy received over the RS.

At 320, when the measured channel metric satisfies a specified channel metric threshold value, the UE processes information included in the subframe according to an LTE communication protocol. Processing subframe information according to an LTE communication protocol can include, among other things, decoding physical downlink control channel PDCCH information, decoding enhanced physical downlink control channel (ePDCCH) information, or decoding physical downlink shared channel (PDSCH) information. Processing subframe information according to an LTE communication protocol can also include transmitting channel estimate information calculated by the UE back to an eNB. If the measured channel metric does not satisfy the specified channel metric threshold value, the UE proceeds to process the next subframe. In some examples, the channel metric is averaged over the duration of an averaging window. If the averaged channel metric is not satisfied, the UE proceeds to average the channel metric over a subsequent averaging window.

Communication over the shared communication channel may be further complicated if multiple LTE operators may share the LTE-U medium. As explained previously herein, reference signals such as cell specific reference signals (CRS) are inserted in subframes that can be used to estimate the channel. A UE may detect reference signals sent by devices of multiple LTE operators on the shared LTE-U channel. This can result in the UE being unable to process information or lead to the UE processing incorrect channel information. For example, the UE may listen for communications from an eNB of a first operator of an LTE network. The UE may detect a CRS from an eNB of a second operator that is serving the cell location of the UE. If the physical cell identity (PCI) of the detected CRS happens to be the same of the eNB of the first operator, the UE may process information transmitted from the incorrect eNB and configure itself for communication using a different LTE-U to which it is not actually close enough to use. This problem can be avoided by communications on the LTE-U being operator specific so that a UE can recognize that the subframe is from the correct operator.

To ensure that the detected reference signals are from the correct LTE operator, an operator-specific RS sequence is generated and used in communications between the eNB and the UE. In some embodiments, the RS sequence is generated using information included in a physical cell (PCell) system information broadcast (SIB). Some examples of such information include a public land mobile network (PLMN) identity or an evolved cell global identifier (E-CGI). The UE uses the information to initialize the RS sequence. This allows the UE to recognize the operator specific RS sequence from an eNB and generate an RS according to the sequence. The UE communicates the RS via the LTE-U or LAA communication channel and is recognized by the eNB. The RS sequence is unique for UEs operating in the specific PCell.

Figure 4:
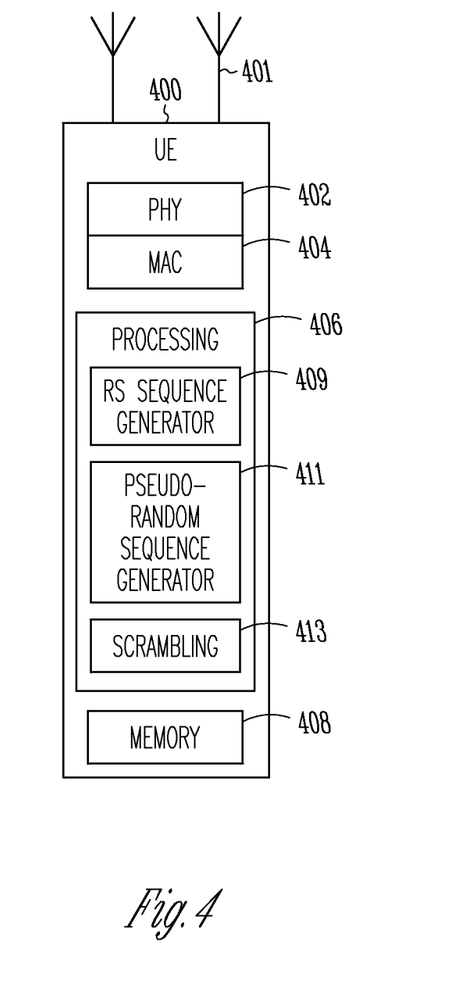
FIG. 4 illustrates a functional block diagram of user equipment in accordance with some embodiments.

FIG. 4 illustrates a functional block diagram of a UE in accordance with some embodiments. UE 400 may be suitable for use as UE 102 (FIG. 1). In some embodiments, the UE 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 400 may include one or more of a keyboard, a display, a non-volatile memory port, multiple antennas, a graphics processor, an application processor, speakers, and other mobile device elements. The display may be an LCD screen including a touch screen.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

The UE 400 includes physical layer (PHY) circuitry 402 arranged to transmit and receive radio frequency (RF) electrical signals directly with one or more nodes of a radio access network (e.g., eNBs 104 of FIG. 1) using one or more antennas 401 conductively coupled to the PHY circuitry 402. The PHY circuitry 402 may include one or more transceiver circuits and may include circuitry for modulation/demodulation, upconversion/downconversion, filtering, amplification, etc.

UE 400 may also include medium access control layer (MAC) circuitry 404 for controlling access to the wireless medium. The MAC circuitry 404 may be arranged to contend for a wireless medium to configure frames or packets for communicating over the wireless medium. UE 400 may also include processing circuitry 406 and memory 408 arranged to perform the operations described herein. The processing circuitry 406 may include one or more processors. The memory 408 may store information for configuring the processing circuitry 406 to perform operations of configuring and transmitting HEW frames and performing the various operations described herein.

In some embodiments, two or more antennas may be coupled to the physical layer circuitry arranged for sending and receiving signals. The antennas 401 utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to $1/10$ of a wavelength or more.

The UE 400 may acquire physical cell id (PCI), time slot and frame synchronization when it synchronizes with a cell. In some embodiments, a primary synchronization signal PSS and a secondary synchronization signal SSS provide the UE with its physical layer identity within the cell. The signals may also provide frequency and time synchronization within the cell. The PSS may be constructed from Zadoff-Chu (ZC) sequences and the length of the sequence may be predetermined (e.g., 62) in the frequency domain. The SSS uses two interleaved sequences (e.g., maximum length sequences (MLS), SRG-sequences, or m-sequences) which are of a predetermined length (e.g., 31). The SSS may be scrambled with the PSS sequences that determine physical layer ID. One purpose of the SSS is to provide the UE with information about the cell ID, frame timing properties and the cyclic prefix (CP) length. The UE may also be informed whether to use frequency domain duplexing (FDD) or time domain duplexing (TDD). FDD uses different uplink and downlink spectrum (e.g., two channels) and TDD technique that uses the same spectrum for uplink and downlink but assigns alternate time slots for transmitting and receiving.

In FDD, the PSS may be located in the last OFDM symbol in first and eleventh slot of the frame, followed by the SSS in the next symbol. In TDD, the PSS may be sent in the third symbol of the 3rd and 13th slots while SSS may be transmitted three symbols earlier. The PSS provides the UE with information about to which of the three groups of physical layers the cell belongs to (3 groups of 168 physical layers). One of 168 SSS sequences may be decoded right after PSS and defines the cell group identity directly.

In some embodiments, each UE is configured in one of 8 "transmission modes" for PDSCH reception: Mode 1: Single antenna port, port 0; Mode 2: Transmit diversity; 3: Large-delay CDD; Mode 4: Closed-loop spatial multiplexing; Mode 5: MU-MIMO; Mode 6: Closed-loop spatial multiplexing, single layer; Mode 7: Single antenna port, UE-specific RS (5); Mode 8 (new in Rel-): Single or dual-layer transmission with UE-specific RS (ports 7 and/or 8). The CSI-RS are used by the UE for channel estimates (e.g., CQI measurements). In some embodiments, the CSI-RS are transmitted periodically in particular antenna ports (up to eight transmit antenna ports) at different subcarrier frequencies (assigned to the UE) for use in estimating a MIMO channel. In some embodiments, a UE-specific demodulation reference signal (e.g., a DM-RS) may be precoded in the same way as the data when non-codebook-based precoding is applied.

The PHY circuitry 402 communicates with at least one of a network node device or another UE using a frequency band licensed to a long term evolution (LTE) network. The PHY circuitry 402 also communicates with an access point device or a network station device using at least one of a frequency band unlicensed to an LTE network (LTE-U) or a frequency band of a licensed assisted access (LAA) network.

When it synchronizes with a cell of an LTE network, the PHY circuitry 402 detects the location of the RS sent by the eNB. To communicate via the shared LTE-U or LAA communication channel, the PHY circuitry 402 listens to the shared channel to detect an RS communicated by the proper eNB in a subframe. The processing circuitry 406 measures a channel metric over at least a portion of the subframe that includes the RS, such as signal power level or total energy received over the RS for example. If the measured channel metric satisfies a specified channel metric threshold value, the processing circuitry 402 processes information included in the subframe according to an LTE communication protocol. Some examples of processing subframe information include decoding PDCCH information, decoding PDSCH information, and estimating one or more channel characteristics of the LTE-U or LAA communication channel. Estimations of channel characteristics can be used to communicate CSI to an eNB.

In some embodiments, the UE communicates with an eNB using a sequence of reference signals that is specific to a network operator. To generate an RS sequence, the processing circuitry 406 includes an RS sequence generator module 409. A module can include hardware, firmware, or software or combinations of hardware, firmware, and software. To ensure that the detected reference signals are from the correct LTE operator, the RS sequence generator module 409 can generate the RS sequence using PCell information received by the PHY circuitry 402, such as from an SIB for example. Because information specific to the PCell is used by the RS sequence generator module 409 to generate the RS sequence, the RS sequence for communications over the LTE-U or LAA communication is operator specific.

According to some embodiments, the RS sequence is generated using a sequence pseudo-random numbers. The RS sequence generator module 409 may include a pseudo-random sequence generator module 411 that generates pseudo-random numbers according to a third generation partnership project (3GPP) specification for example. To make the RS sequence operator specific, in some embodiments the RS sequence generator module 409 may initialize a pseudo-random sequence generated by the pseudo-random sequence generator module 411 with an initial pseudo-random sequence value modified with the PCell information. The RS sequence is obtained using a pseudo-random sequence generated using the modified initial pseudo-random sequence value.

As an example, an RS sequence $r_{l,n_s}(m)$ can be defined by $$r_{l,n_s}(m) = \frac{1}{\sqrt{2}}(1 - 2c(2m)) + j\frac{1}{\sqrt{2}}(1 - 2c(2m + 1)), \quad (1)$$

where $m=0, 1, \ldots, 2N_{RB}^{max,DL}-1$, and $n_s$ is the slot number within a radio frame and l is the OFDM symbol number within the slot.

The c(i) in equation (1) is a pseudo-random number sequence produced by the pseudo-random number generator module 411, such as a pseudo-random sequence defined under a 3GPP specification for example. The pseudo-random number generator module 411 may be initialized with $c_{init}$, where $$c_{init}=2^{10}(7 \cdot (n_S+1)+l+1) \cdot (2 \cdot N_{ID}^{cell}+1)+2 \cdot N_{ID}^{cell}+N_{CP}, \quad (2)$$

at the start of each OFDM symbol, where $N_{CP}=\begin{cases} 0 \text{ for extended } CP \\ 1 \text{ for normal } CP \end{cases}$. The RS sequence can then be generated using a sequence of pseudo-random numbers seeded with the initial value $c_{init}$.

In an LTE network or system, $N_{ID}^{cell}$ is the physical cell identity. To make the RS sequence operator-specific, $c_{init}$ can be defined by $$c_{init}=2^{10}(147 \cdot (N_{OP}+1)=7 \cdot (n_S+1)+l+1) \cdot (2 \cdot N_{ID}^{cell}+1)+ \\ 2 \cdot N_{ID}^{cell}+N_{CP} \text{ mod } P, \quad (3)$$

where P is $2^{31}$ and is the period of the pseudo-random sequence c(i). $N_{OP}$ can be PCell information such as the PLMN identity or E-CGI. Because the PLMN identity consists of a 3 digit mobile country code (MCC) and a 3 digit mobile network code (MNC), the MNC value may be sufficient to uniquely distinguish among the multiple operators in a similar geographical area using an LTE-U or LAA channel. The MNC can be used to set a value for $N_{OP}$ in the initial pseudo-random sequence value $c_{init}$, such as $N_{OP}=$MNC, or $N_{OP}=$last digit of the MNC. The pseudo-random sequence generated using the modified initial pseudo-random sequence value is used to provide an operator-specific RS sequence.

In another example, the RS sequence $r_{l,n_s}(m)$ can be defined as in Equation (1) above, and the initial pseudo-random sequence value $c_{init}$ is defined as in equation (2) above. However, the value of $c_{init}$ is scrambled with operator-specific information such as the PCell information. In some examples, the RS sequence generator module 409 may include a scrambling module 413 to scramble the initial pseudo-random sequence value $c_{init}$. In certain examples, the scrambling module 413 scrambles the initial pseudo-random sequence value $c_{init}$ by applying modulo 2 addition to the binary value of $c_{init}$ and the binary value of the operator-specific information.

In some embodiments, the scrambling module 413 scrambles a pseudo-random number sequence generated by the pseudo-random number sequence module 411 with the PCell information.

For example, the RS sequence $r_{l,n_s}(m)$ can be defined by $$r_{l,n_s}(m) = \frac{1}{\sqrt{2}}(1 - 2d(2m)) + j\frac{1}{\sqrt{2}}(1 - 2d(2m + 1)), \quad (4)$$

where $m=0, 1, \ldots, 2N_{RB}^{max,DL}-1$ as before. The difference is that scrambling module 413 obtains a sequence of d(i) by scrambling the pseudo-random sequence c(i) with the PCell information. The RS sequence can obtained using the sequence d(i) as in equation (4).

Detection of the RS in a subframe communicated over a shared LTE-U or LAA communication channel enables cell network devices to recognize and process cell network specific information sent on the shared channel. Using an operator-specific RS sequence can avoid problems associated with multiple operators trying to use the same shared LTE-U or LAA channel.

ADDITIONAL NOTES AND EXAMPLES

Example 1 can include subject matter (such as a UE) comprising physical layer circuitry and processing circuitry. The physical layer circuitry is configured to transmit and receive radio frequency electrical signals with one or more nodes of a radio access network, including to: monitor at least one of a communication channel unlicensed to a long term evolution (LTE) network (LTE-U) or a communication channel of a licensed assisted access (LAA) network; and detect a reference signal (RS) of a subframe communicated using the at least one communication channel. The processing circuitry is configured to: measure a channel metric over at least a portion of the subframe that includes the RS; and process information included in the subframe according to an LTE communication protocol when the measured channel metric satisfies a specified channel metric threshold value.

In Example 2, the subject matter of Example 1 optionally includes processing circuitry includes a RS sequence generator module configured to generate an RS of an RS sequence that is unique to the UE among UEs operating within a specific physical cell (PCell); and wherein the processing circuitry is configured to communicate the RS via the at least one communication channel.

In Example 3, the subject matter of Example 2 optionally includes physical layer circuitry is configured to receive PCell information using the UE and the RS sequence generator module is configured to generate the RS of the RS sequence using the received PCell information.

In Example 4, the subject matter of Example 3 optionally includes PCell information including at least one of a public land mobile network (PLMN) identity or an evolved cell global identifier (E-CGI).

In Example 5, the subject matter of one or both of Examples 3 and 4 optionally includes an RS sequence generator module including a pseudo-random number sequence generator module and a scrambling module, wherein the scrambling module is configured to scramble a pseudo-random number sequence generated by the pseudo-random number sequence generator module with the PCell information, and wherein the RS sequence module is configured to obtain the RS sequence using the scrambled pseudo random number sequence.

In Example 6, the subject matter or one or any combination of Examples 3-5 optionally includes an RS sequence generator module including a pseudo-random number sequence generator module, and wherein the RS sequence generator module is configured to initialize a pseudo-random sequence generated by the pseudo-random sequence generator module with an initial pseudo-random sequence value modified with the PCell information and obtain the RS sequence using a pseudo-random sequence generated using the modified initial pseudo-random sequence value.

In Example 7, the subject matter of one or any combination of Examples 1-6 optionally includes processing circuitry configured to decode at least one of physical downlink control channel PDCCH information, enhanced physical downlink control channel (ePDCCH) information, or physical downlink shared channel (PDSCH) information using subframe information when the measured channel metric satisfies a specified channel metric threshold value.

In Example 8, the subject matter of one or any combination of Examples 1-7 optionally includes processing circuitry configured to estimate one or more channel characteristics when the measured channel metric satisfies a specified channel metric threshold value, and communicate channel state information (CSI) using the one or more channel characteristics.

In Example 9, the subject matter of one or any combination of Examples 1-8 optionally includes physical layer circuitry is configured to: communicate with at least one of a network node device or another UE using a frequency band licensed to a long term evolution (LTE) network; and to communicate with an access point device or a network station device using at least one of a frequency band unlicensed to an LTE network (LTE-U) or a frequency band of a licensed assisted access (LAA) network.

In Example 10, the subject matter of one or any combination of Examples 1-9 optionally includes a plurality of antennas conductively coupled to the physical layer circuitry.

Example 11 can include subject matter, or can optionally be combined with the subject matter of one or any combination of Examples 1-10 to include such subject matter, such as a computer readable storage medium to store instructions for execution by one or more processors of user equipment (UE) to perform operations to configure the UE to: monitor a communication channel using the UE, wherein the communication channel is at least one of a communication channel unlicensed to a long term evolution (LTE) network (LTE-U) or a communication channel of a licensed assisted access (LAA) network; detect a reference signal (RS) of a subframe communicated using the communication channel; measure a channel metric over at least a portion of the subframe that includes the RS; and process information included in the subframe according to an LTE communication protocol when the measured channel metric satisfies a specified channel metric threshold value.

In Example 12, the subject matter of Example 11 can optionally include instructions to perform operations to configure the UE to: generate an RS of an RS sequence using received physical cell (PCell) information, wherein the RS of the RS sequence is unique to UEs operating in the PCell associated with the PCell information; and communicate the RS via the communication channel.

In Example 13, the subject matter of Example 12 optionally includes instructions to perform operations to configure the UE to receive PCell information using the UE, and generate an RS of an RS sequence by the UE using the received PCell information.

In Example 14, the subject matter of one or both of Examples 12 and 13 optionally includes instructions to perform operations to configure the UE to initialize a pseudo-random sequence generated by the UE with an initial pseudo-random sequence value modified with the PCell information; obtain the RS sequence using a pseudo-random sequence generated by the UE with the modified initial pseudo-random sequence value; and communicate the RS via the communication channel.

In Example 15, the subject matter of one or any combination of Examples 12-14 optionally includes instructions to perform operations to configure the UE to: generate a pseudo-random number sequence using the UE, scramble the generated pseudo random number sequence with the PCell information, and use the scrambled pseudo random number sequence to produce the RS sequence.

In Example 16, the subject matter of one or any combination of Examples 11-15 optionally includes instructions to perform operations to configure the UE to: receive PCell information that includes at least one of a public land mobile network (PLMN) identity information or an evolved cell global identifier (E-CGI) information; and generate the RS of an RS sequence using the at least one of the PLMN identity information or the E-CGI information.

In Example 17, the subject matter of one or any combination of Examples 11-15 optionally includes instructions to perform operations to configure the UE to: estimate channel characteristics using the measured channel metric and communicating channel state information (CSI) according to the channel characteristics.

Example 18 can include subject matter (such as an apparatus of UE), or can optionally be combined with the subject matter of one or any combination of Examples 1-17 to include such subject matter, comprising processing circuitry configured to: measure a channel metric over at least a portion of a subframe communicated by a separate device using at least one of a communication channel unlicensed to a long term evolution (LTE) network (LTE-U) or a communication channel of a licensed assisted access (LAA) network, wherein the channel metric is measured over at least a portion of the subframe that includes a reference signal (RS); and decode at least one of physical downlink control channel PDCCH information, enhanced physical downlink control channel (ePDCCH) information, or physical downlink shared channel (PDSCH) information when the measured channel metric satisfies a specified channel metric threshold value.

In Example 19, the subject matter of Example 18 optionally includes a transceiver circuit configured to transmit and receive radio frequency electrical signals via the cellular network and the at least one communication channel unlicensed to a long term evolution (LTE) network (LTE-U) or communication channel of a licensed assisted access (LAA) network.

In Example 20, the subject matter of one or both of Examples 18 and 19 optionally includes processing circuitry configured to generate an RS of an RS sequence using physical cell (PCell) information received via the cellular network, and initiate communication of the RS via the at least one communication channel.

In Example 21, the subject matter of Example 20 optionally includes processing circuitry configured to: initialize a pseudo-random sequence generated by the UE with an initial pseudo-random sequence value modified with the PCell information; obtain the RS sequence using a pseudo-random sequence generated by the UE with the modified initial pseudo-random sequence value; and communicate the RS via the communication channel.

In Example 22, the subject matter of one or both Examples 20 and 21 optionally includes processing circuitry configured to: generate a pseudo-random number sequence, scramble the generated pseudo random number sequence with the PCell information, and use the scrambled pseudo random number sequence to produce the RS sequence.

In Example 23, the subject matter of one or any combination of Examples 20-22 optionally includes processing circuitry configured to: initialize a pseudo-random sequence generated by the UE with an initial pseudo-random sequence value modified with the PCell information; obtain the RS sequence using a pseudo-random sequence generated by the UE with the modified initial pseudo-random sequence value; and communicate the RS via the communication channel.

In Example 24, the subject matter of one or any combination of Examples 20-23 optionally includes the processing circuitry is configured to receive PCell information that includes at least one of the public land mobile network (PLMN) identity or the evolved cell global identifier (E-CGI).

In Example 25, the subject matter of one or any combination of Examples 18-24 optionally includes the processing circuitry configured to estimate channel characteristics using the measured channel metric and communicate channel state information (CSI) according to the channel characteristics.

These non-limiting examples can be combined in any permutation or combination.

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Method examples described herein can be machine or computer-implemented at least in part. Some examples can include a computer-readable storage medium or machine-readable storage medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. The code can be tangibly stored on one or more volatile, non-transitory, or non-volatile tangible computer-readable media, such as during execution or at other times. Examples of these tangible computer-readable storage media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A user equipment device (UE) comprising:
   physical layer circuitry configured to transmit and receive radio frequency electrical signals with one or more nodes of a radio access network, including to:
   monitor at least one of a communication channel unlicensed to a long term evolution (LTE) network (LTE-U) or a communication channel of a licensed assisted access (LAA) network; and
   detect a reference signal (RS) of a subframe communicated using the at least one communication channel; and
   processing circuitry configured to:
   measure a channel metric over at least a portion of the subframe that includes the RS; and
   process information included in the subframe according to an LTE communication protocol when the measured channel metric satisfies a specified channel metric threshold value,
   wherein the processing circuitry includes a RS sequence generator module including a pseudo-random number sequence generator module, wherein the RS sequence generator is configured to generate an RS of an RS sequence using a pseudo-random number sequence determined using physical cell (PCell) information unique to the UE among UEs operating within a specific PCell, and the processing circuitry is further configured to communicate the RS via the at least one communication channel.

2. The UE of claim 1, wherein the physical layer circuitry is configured to receive the PCell information using the UE and the RS sequence generator module is configured to generate the RS of the RS sequence using the received PCell information.

3. The UE of claim 1, wherein the PCell information includes at least one of a public land mobile network (PLMN) identity or an evolved cell global identifier (E-CGI), and the RS sequence generator is configured to generate the RS of an RS sequence using the at least one of the PLMN identity information or the E-CGI information.

4. The UE of claim 1, wherein the RS sequence generator module includes a scrambling module, wherein the scrambling module is configured to scramble a pseudo-random number sequence generated by the pseudo-random number sequence generator module with the PCell information, and wherein the RS sequence module is configured to obtain the RS sequence using the scrambled pseudo random number sequence.

5. The UE of claim 1, wherein the RS sequence generator module is configured to initialize a pseudo-random sequence generated by the pseudo-random sequence generator module with an initial pseudo-random sequence value modified with the PCell information and obtain the RS sequence using a pseudo-random sequence generated using the modified initial pseudo-random sequence value.

6. The UE of claim 1, wherein processing circuitry is configured to decode at least one of physical downlink control channel PDCCH information, enhanced physical downlink control channel (ePDCCH) information, or physical downlink shared channel (PDSCH) information using subframe information when the measured channel metric satisfies a specified channel metric threshold value.

7. The UE of claim 1, wherein processing circuitry is configured to estimate one or more channel characteristics when the measured channel metric satisfies a specified channel metric threshold value, and communicate channel state information (CSI) using the one or more channel characteristics.

8. The UE of claim 1, wherein the physical layer circuitry is configured to:
communicate with at least one of a network node device or another UE using a frequency band licensed to a long term evolution (LTE) network; and to communicate with an access point device or a network station device using at least one of a frequency band icensed to an LTE network (LTE-U) or a frequency band of a licensed assisted access (LAA) network.

9. The UE of claim 1, including a plurality of antennas conductively coupled to the physical layer circuitry.

10. A non-transitory computer-readable storage medium that stores instructions for execution by one or more processors of user equipment (UE) to perform operations to configure the UE to:
monitor a communication channel using the UE, wherein the communication channel is at least one of a communication channel unlicensed to a long term evolution (LTE) network (LTE-U) or a communication channel of a licensed assisted access (LAA) network;
detect a reference signal (RS) of a subframe communicated using the communication channel;
measure a channel metric over at least a portion of the subframe that includes the RS;
process information included in the subframe according to an LTE communication protocol when the measured channel metric satisfies a specified channel metric threshold value;
receive PCell information that includes at least one of a public land mobile network (PLMN) identity information or an evolved cell global identifier (E-CGI) information; and
generate an RS of an RS sequence using the at least one of the PLMN identity information or the E-CGI information.

11. The non-transitory computer-readable storage medium of claim 10, including instructions to perform operations to configure the UE to: initialize a pseudo-random sequence generated by the UE with an initial pseudo-random sequence value modified with the PCell information; obtain the RS sequence using a pseudo-random sequence generated by the UE with the modified initial pseudo-random sequence value; and communicate the RS via the communication channel.

12. The non-transitory computer-readable storage medium of claim 10, including instructions to perform operations to configure the UE to generate a pseudo-random number sequence using the UE, scramble the generated pseudo random number sequence with the PCell information, and use the scrambled pseudo random number sequence to produce the RS sequence.

13. The non-transitory computer-readable storage medium of claim 10, including instructions to perform operations to configure the UE to: estimate channel characteristics using the measured channel metric and communicating channel state information (CSI) according to the channel characteristics.

14. An apparatus of a user equipment device (UE) of a cellular network, the apparatus comprising processing circuitry configured to:
measure a channel metric over at least a portion of a subframe communicated by a separate device using at least one of a communication channel unlicensed to a long term evolution (LTE) network (LTE-U) or a communication channel of a licensed assisted access (LAA) network, wherein the channel metric is measured over at least a portion of the subframe that includes a reference signal (RS);
decode at least one of physical downlink control channel PDCCH information, enhanced physical downlink control channel (ePDCCH) information, or physical downlink shared channel (PDSCH) information when the measured channel metric satisfies a specified channel metric threshold value;
generate an RS of an RS sequence as a pseudo-random number sequence determined using physical cell (PCell) information received via the cellular network; and
initiate communication of the RS via the at least one communication channel.

15. The apparatus of claim 14, including a transceiver circuit configured to transmit and receive radio frequency electrical signals via the cellular network and the at least one communication channel unlicensed to a long term evolution (LTE) network (LTE-U) or communication channel of a licensed assisted access (LAA) network.

16. The apparatus of claim 14, wherein the processing circuitry is configured to: initialize a pseudo-random sequence generated by the UE with an initial pseudo-random sequence value modified with the PCell information; obtain the RS of the RS sequence using a pseudo-random sequence generated by the UE with the modified initial pseudo-random sequence value; and communicate the RS via the communication channel.

17. The apparatus of claim 14, wherein the processing circuitry is configured to: generate a pseudo-random number sequence, scramble the generated pseudo random number sequence with the PCell information, and use the scrambled pseudo random number sequence to produce the RS of the RS sequence.

18. The apparatus of claim 14, wherein the processing circuitry is configured to: initialize a pseudo-random sequence generated by the UE with an initial pseudo-random sequence value modified using PCell information that includes at least one of the public land mobile network (PLMN) identity or the evolved cell global identifier (E-CGI); obtain the RS of the RS sequence using a pseudo-random sequence generated by the UE with the modified initial pseudo-random sequence value; and communicate the RS via the communication channel.

19. The apparatus of claim 14, wherein the processing circuitry is configured to receive PCell information that includes at least one of the public land mobile network (PLMN) identity or the evolved cell global identifier (E-CGI) and generate the RS of an RS sequence using the at least one of the PLMN identity information or the E-CGI information.

20. The apparatus of claim 14, wherein the processing circuitry is configured to estimate channel characteristics using the measured channel metric and communicate channel state information (CSI) according to the channel characteristics.

* * * * *

UNITED STATES PATENT AND TRADEMARK OFFICE
CERTIFICATE OF CORRECTION

PATENT NO. : 9,900,134 B2
APPLICATION NO. : 14/747663
DATED : February 20, 2018
INVENTOR(S) : Kwon et al.

Page 1 of 1

It is certified that error appears in the above-identified patent and that said Letters Patent is hereby corrected as shown below:

In the Claims

In Column 15, Line 11, in Claim 8, after "and", insert --¶--

In Column 15, Line 13, in Claim 8, delete "icensed" and insert --unlicensed-- therefor In Column 15, Line 44, in Claim 11, after "to:", insert --¶--

In Column 15, Line 47, in Claim 11, after "information;", insert --¶--

In Column 15, Line 49, in Claim 11, after "and", insert --¶--

In Column 16, Line 29, in Claim 16, after "to:", insert --¶--

In Column 16, Line 31, in Claim 16, after "information;", insert --¶--

In Column 16, Line 34, in Claim 16, after "and", insert --¶--

In Column 16, Line 44, in Claim 18, after "to:", insert --¶--

In Column 16, Line 49, in Claim 18, after "(E-CGI);", insert --¶--

In Column 16, Line 51, in Claim 18, after "and", insert --¶--

Signed and Sealed this
Eleventh Day of June, 2019

Andrei Iancu
*Director of the United States Patent and Trademark Office*